US012553109B2

(12) United States Patent
Guillotte et al.

(10) Patent No.: US 12,553,109 B2
(45) Date of Patent: Feb. 17, 2026

(54) METHOD FOR RECOVERING CHROMIUM CONTAINED IN A BATH FOR PICKLING METALLIC MATERIALS AND FACILITY FOR IMPLEMENTING SAME

(71) Applicant: APERAM, Luxembourg (LU)

(72) Inventors: Ismael Guillotte, Verquin (FR); Eris Sinoimeri, Grenoble (FR); Isabelle Billard, Grenoble (FR); Jerôme Cognard, Domene (FR); Nadine Commenges-Bernole, Bourget du Lac (FR); Jean-Michel Damasse, Saint Etienne (FR)

(73) Assignee: APERAM, Luxembourg (LU)

( * ) Notice: Subject to any disclaimer, the term of this patent is extended or adjusted under 35 U.S.C. 154(b) by 804 days.

(21) Appl. No.: 17/640,743

(22) PCT Filed: Sep. 6, 2019

(86) PCT No.: PCT/IB2019/057527
§ 371 (c)(1),
(2) Date: Mar. 4, 2022

(87) PCT Pub. No.: WO2021/044200
PCT Pub. Date: Mar. 11, 2021

(65) Prior Publication Data
US 2022/0316027 A1 Oct. 6, 2022

(51) Int. Cl.
*C22B 34/32* (2006.01)
*C22B 3/26* (2006.01)

(52) U.S. Cl.
CPC .............. *C22B 34/32* (2013.01); *C22B 3/41* (2021.05)

(58) Field of Classification Search
None
See application file for complete search history.

(56) References Cited

U.S. PATENT DOCUMENTS

2015/0166411 A1\* 6/2015 Ortmann .................. C09C 1/58
106/284.02

FOREIGN PATENT DOCUMENTS

| CN | 102531139 A | 7/2012 |
| CN | 102531139 | 11/2013 |

(Continued)

OTHER PUBLICATIONS

CN102531139B English language translation (Year: 2013).\*

(Continued)

*Primary Examiner* — Sally A Merkling
*Assistant Examiner* — Sean P. O'Keefe
(74) *Attorney, Agent, or Firm* — NIXON & VANDERHYE

(57) ABSTRACT

Method for recovering Cr from a pickling bath of an aqueous solution containing sulphate and Cr from a pickled metal, the method including: —forming an aqueous two-phase system from a portion of the pickling bath and a polymer including an unhindered ether function, the proportion of polymer in the ternary mixture including the pickling bath, considered to be a unique chemical component, water and polymer, ranging between the line of the equation «weight % of polymer=100%–weight % of pickling bath» and the binodal curve of the pickling bath/polymer mixture, the two-phase aqueous system including polymer and non-polymer phases; —separating the respective phases; —allowing precipitates containing Cr to form in the polymer phase; —carrying out solid/liquid separation of the polymer phase to separate the polymer and the precipitates containing Cr; —and processing the precipitates to recover the Cr. A facility is also disclosed.

17 Claims, 4 Drawing Sheets

(56) References Cited

FOREIGN PATENT DOCUMENTS

| CN | 107352709 A | * | 11/2017 | ................ C02F 9/00 |
|---|---|---|---|---|
| JP | 2012-207997 A | | 10/2012 | |
| KZ | 31863 B | | 2/2017 | |
| RU | 2175025 C1 | | 10/2001 | |
| RU | 2214472 C1 | | 10/2003 | |
| WO | WO-2010051992 A1 | * | 5/2010 | ........... C01B 17/901 |
| WO | 2018/087364 | | 5/2018 | |

OTHER PUBLICATIONS

Jie Lil, et al., "An ecological new approach for treating Cr(VI)-containing industrial wastewater: Photochemical reduction", Water Research, Elsevier, vol. 93, Feb. 16, 2016, pp. 187-194 (8 pages).
International Search Report for PCT/IB2019/057527 dated Jul. 7, 2020, 11 pages.
Written Opinion of the ISA for PCT/IB2019/057527 dated Jul. 7, 2020, 14 pages.

\* cited by examiner

METHOD FOR RECOVERING CHROMIUM CONTAINED IN A BATH FOR PICKLING METALLIC MATERIALS AND FACILITY FOR IMPLEMENTING SAME

CROSS-REFERENCE TO RELATED APPLICATIONS

This application is the U.S. national phase of International Application No. PCT/IB2019/057527 filed Sep. 6, 2019 which designated the U.S., the entire contents of which are hereby incorporated by reference.

BACKGROUND OF THE INVENTION

Field of the Invention

The present invention concerns the pickling of Cr-containing metallic materials, in particular steels high in Cr such as stainless steels. More specifically, it concerns the recovery of metals found in the dissolved state in pickling baths containing sulphates, for the purpose of regenerating these baths and hence allow their reuse or inclusion in a continuous processing method without rapid degradation of the performance of said method, thereby upgrading the recovered metals as much as is possible.

Description of the Related Art

Chemical pickling is an essential operation in the process of steel manufacture. It consists of removing the oxidized layer on the surface of the part and immersing the part in an aqueous solution, most often highly acid (in particular a solution containing one or more acids typically selected from among HCl, $HNO_3$, $H_2SO_4$, HF), but also possibly containing neutral salts e.g. sulphates such as $Na_2SO_4$, $K_2SO_4$, $(NH_4)_2SO_4$.

Baths high in sulphates are particularly used in electrolytic pickling processes.

The oxidized layers to be pickled are formed at the time of heat treatments performed in oxidizing atmospheres (air in particular). This pickling is often performed on travelling conveyed strips. It allows lamination of the strips without the risk of oxides becoming embedded in the surface of the strip thereby deteriorating appearance and quality, or allows surface treatment under good conditions.

Throughout this pickling operation, the baths become enriched with metal salts derived from dissolving of the oxide layers and/or of the base metal.

This loading of baths with metal salts is harmful from two viewpoints. The first is that the presence of metal cations in the bath in too great amount shifts the chemical and electrochemical equilibria existing in new baths, thereby reducing the efficacy of pickling. The second is that when these dissolved metals reach their limit solubility concentration, they precipitate and form sludge within the baths. These sludges can lead to problems of surface quality if they are deposited on the treated product or on the rollers orienting the travel path of the product. They can also be deposited in the vats, tanks and piping of the pickling installation and hence be detrimental to the proper functioning of this installation.

Faced with this change in the metal content of pickling baths and associated loss of efficacy, the only simple means for industrialists is to regenerate the spent bath either fully or partially by adding fresh bath thereto. Before regeneration, all or part of the spent bath is sent to a neutralisation station where it is mixed with other spent baths and then treated to reduce the Cr(VI) ions contained therein (by reduction with Fe(II) or sodium $NaHSO_3$ for example), followed by precipitation of the metal cations through the addition of NaOH or $Ca(OH)_2$. The solid elements are then separated from the liquid via flocculation/settling and filtered on a press filer. The cakes of metal hydroxide sludge obtained are discarded as waste since there exists no upgrading treatment of this sludge that is economically viable.

This sludge is composed of the mixture of metals dissolved in the different surface treatment baths, and of the anions of at least part of these baths. For example, the high S and F content of this sludge derived from acid baths, when they use $H_2SO_4$ and HF, prevent reuse of this waste via pyrometallurgic route. Faced with this drawback, one solution is to separate the neutralisation flows to obtain on one side the spent baths containing F and S, and on the other side the baths having by-products that are less difficult to recycle.

Treatment solutions concerning a particular type of bath already exist and are in use. These solutions, such as roast spraying for hydrochloride baths generally allow regeneration of acid on one side and recovery of metals on the other. These methods are often costly and do not always allow regeneration of an acid in a concentration able to be used in an industrial process. In addition, these methods are generally energy-intensive and/or consume large amounts of water and/or use resins or ion exchange membranes requiring cleaning cycles during which the installation cannot be used.

SUMMARY OF THE INVENTION

It is the object of the invention to propose a method that is both efficient and economically viable for regenerating spent electrolytic pickling baths and for recovering the Cr contained in these spent electrolytic pickling baths containing relatively high quantities of one or more sulphur-containing compounds such as sulphates.

For this purpose, the subject of the invention is a method for recovering Cr from a pickling bath of metallic materials contained in a receptacle such as a pickling tank, said pickling bath being an aqueous solution containing at least one sulphate and Cr derived from the pickled metal, characterized in that:

an aqueous two-phase system is formed from at least one portion of said pickling bath and from a polymer comprising an unhindered ether function, said polymer preferably being a polyethylene-glycol, typically PEG-200, PEG-400 or PEG-600, optimally PEG-400, the proportion of polymer in the ternary mixture—formed by the pickling bath considered to be a single chemical component, water and the polymer—being such that it lies between the line of the equation «weight % polymer=100%−weight % of pickling bath» and the binodal curve of the pickling bath/polymer mixture at bath temperature, said aqueous two-phase system comprising a polymer phase in which most of the Cr is found, and a non-polymer phase;

said polymer and non-polymer phases are separated;

in the polymer phase, Cr-containing precipitates are left to form;

solid-liquid separation is performed on said polymer phase, to separate the polymer and Cr-containing precipitates;

said precipitates are treated to recover the Cr contained therein.

Preferably, to accelerate the formation kinetics of the Cr-containing precipitates and polymer, said polymer phase is irradiated before said solid-liquid separation by exposure to at least one light source of wavelength between 340 and 860 nm.

Prior to exposure to said light source, the polymer phase can be placed in the form of a liquid film.

After said solid-liquid separation on said polymer phase, dehydration of the liquid fraction resulting from this separation can be carried out to recover the polymer contained therein and said polymer is reused to form said aqueous two-phase mixture.

Said dehydration can be performed by distillation.

The water resulting from said dehydration can be sent to the receptacle containing the pickling bath.

Recovery of Cr from the precipitates in which it is contained, after their separation from the remainder of the irradiated polymer phase, can be performed via pyrometallurgic process.

Said pyrometallurgic process can be pyrometallurgical reduction of oxides using carbon.

Said process can comprise the following steps:
  a fraction of the pickling bath is extracted from a receptacle containing the pickling bath;
  an aqueous two-phase system is formed from at least one portion of said pickling bath and from a polymer comprising an unhindered ether function, said polymer preferably being a polyethylene glycol, typically a polyethylene-glycol of PEG-200, PEG-400 or PEG-600 type, optimally PEG-400, the proportion of polymer in the ternary mixture—formed by the pickling bath considered to be a single chemical component, water and the polymer—being such that it lies between the line of the equation «weight % of polymer=100%−weight % of pickling bath» and the binodal curve of the pickling bath/polymer mixture at bath temperature, said aqueous two-phase system comprising a polymer phase in which most of the Cr is found, and a non-polymer phase;
  said non-polymer phase of said aqueous two-phase mixture is returned to the receptacle containing the pickling bath.

The receptacle containing the pickling bath can be continuously fed with pickling bath.

Said pickled metal can be a stainless steel.

A further subject of the invention is a facility for recovering Cr contained in a metal pickling bath, said pickling bath being an aqueous solution containing at least one sulphate and Cr(VI) derived from the pickled metal, characterized in that it comprises:
  a receptacle containing said pickling bath;
  a mixer reactor connected to said pickling tank;
  a receptacle containing a polymer intended to be added to said mixer reactor to form an aqueous two-phase system with said pickling bath;
  a device to separate the phases of said aqueous two-phase system into a polymer phase and a non-polymer phase;
  and a solid-liquid installation acting on said polymer phase to separate from said polymer the Cr(VI)-containing precipitates present in the polymer phase.

The facility may also comprise an installation to irradiate said polymer phase via radiation by at least one light source of wavelength(s) in the 340-860 nm range, to accelerate the formation of Cr-containing precipitates.

The facility may also comprise means to place said polymer phase in film form and to expose said film to at least one light source having a wavelength in the 340-860 nm wavelength range.

The facility may also comprise an installation to recover Cr from said Cr-containing precipitates.

Said Cr recovery installation can have recourse to a pyrometallurgical process such as pyrometallurgical reduction of oxides using carbon.

The facility may comprise a dehydration installation of said polymer after separation thereof from said Cr-containing precipitates.

Said mixer reactor and said device separating the phases of said aqueous two-phase system can be composed of the same item of equipment.

The receptacle containing the pickling bath can be a pickling tank.

The facility may comprise at least one of the following means:
  means for recycling the non-polymer phase in the pickling bath;
  means for returning the spent polymer after dehydration thereof to said receptacle containing the polymer;
  and means for returning the water, resulting from dehydration of the spent polymer, back to the pickling tank.

As will have been understood, for the recovery of Cr from a spent pickling bath, electrolytic pickling in particular, containing one or more sulphates, the invention has recourse to liquid-liquid extraction via the use of polymers leading to the formation of aqueous two-phase systems capable of extracting Cr(VI) most preferably from the pickling bath.

It appears that the polymers able to be used in the invention have the characteristic of possessing an unhindered ether function i.e. free of groups grafted on the polymer chain in the immediate vicinity of the ether function.

Polyethylene-glycol, in particular PEG-200, PEG-400 and PEG-600, is the polymer of choice able to be used in the invention. PEG-400 is the preferred example.

General information on aqueous two-phase systems containing polymers can be found for example in the following documents:
  «Partitioning in Aqueous Two-Phase Systems: Fundamentals, Applications and Trends», by A. Lima Grilo, M. Raquel Aires-Barros, A. M. Azevedo, Separation and Purification Review 45 (2016), pp 68-80;
  «Influence of Different Phase-Forming Parameters on the Phase Diagram of Several PEG-Salt Aqueous Two-Phase Systems», by B. A. Glyk, T. Scheper, S. Beutel, J. Chem. Eng. Data, 59 (2014), pp. 850-859.

BRIEF DESCRIPTION OF THE DRAWINGS

The invention is now described with reference to the following appended Figures.

DESCRIPTION OF THE PREFERRED EMBODIMENTS

It is first recalled that electrolytic pickling baths containing sulphate(s), called «electro-sulphate baths», are chiefly used at the start of the pickling sequence for final annealing of stainless steels. Sodium sulphate, which is typically used in these baths, has no action on the surface of stainless steels, but is used solely to convey the electrolysis current. Electrolysis is used to convert the Cr(III) contained in the layer of oxides on the surface of the strip to highly soluble Cr(VI) which will therefore be released into the bath. Therefore, as and when pickling progresses, the bath becomes loaded with Cr(VI). This loading induces changes in the equilibria of chemical and electrochemical reactions taking place in this bath and leads to loss of pickling efficacy when the bath reaches strong concentrations of dissolved metals.

In addition, Cr(VI) is a chemical species with CMR classification (carcinogenic, mutagenic, toxic to reproduction) according to the European REACH regulation. It is therefore a major hazard for persons exposed thereto. Although this bath is treated and accordingly neutralised, the formation and accumulation in large quantities of Cr(VI) in the bath amount to a safety and health risk for operators working in the vicinity of pickling baths.

For all these reasons, it is important to be able to recover this Cr(VI) in a form making it harmless, so that subsequent recovery of Cr can be carried out under suitable conditions of hygiene and safety, and at non-prohibitive cost.

It is also recalled that the extraction of elements contained in a solution via the formation of a two-phase system is a method already known in recovery sectors. However, in most cases, these methods use organic solvents or ionic liquids which have the disadvantage of being costly and/or toxic.

A first advancement with this method is disclosed in document WO-A-2018/087364. By placing the solution to be treated containing the inorganic salt in contact with the ionic liquid in some proportions, it is possible to form an aqueous two-phase system in which the species will be divided between one or other of the two phases. However, no application of this advancement in pickling baths for metals and alloys is envisaged in this document.

It has also been shown that it is possible to form aqueous two-phase systems with some polymers.

With the method of the invention, it is possible first to extract Cr dissolved in the pickling bath containing one or more sulphates, and to obtain an S-depleted sludge therefrom (i.e. containing less than 0.03% S, compared with about 8% when a conventional precipitation method of metal cations by CaO is used followed by filtration), which can therefore be treated by pyrometallurgic means without the risk of discharge of sulphur-containing compounds, and secondly as is preferable the bath thus depleted of Cr can be recycled for reuse thereof.

Figure 1:
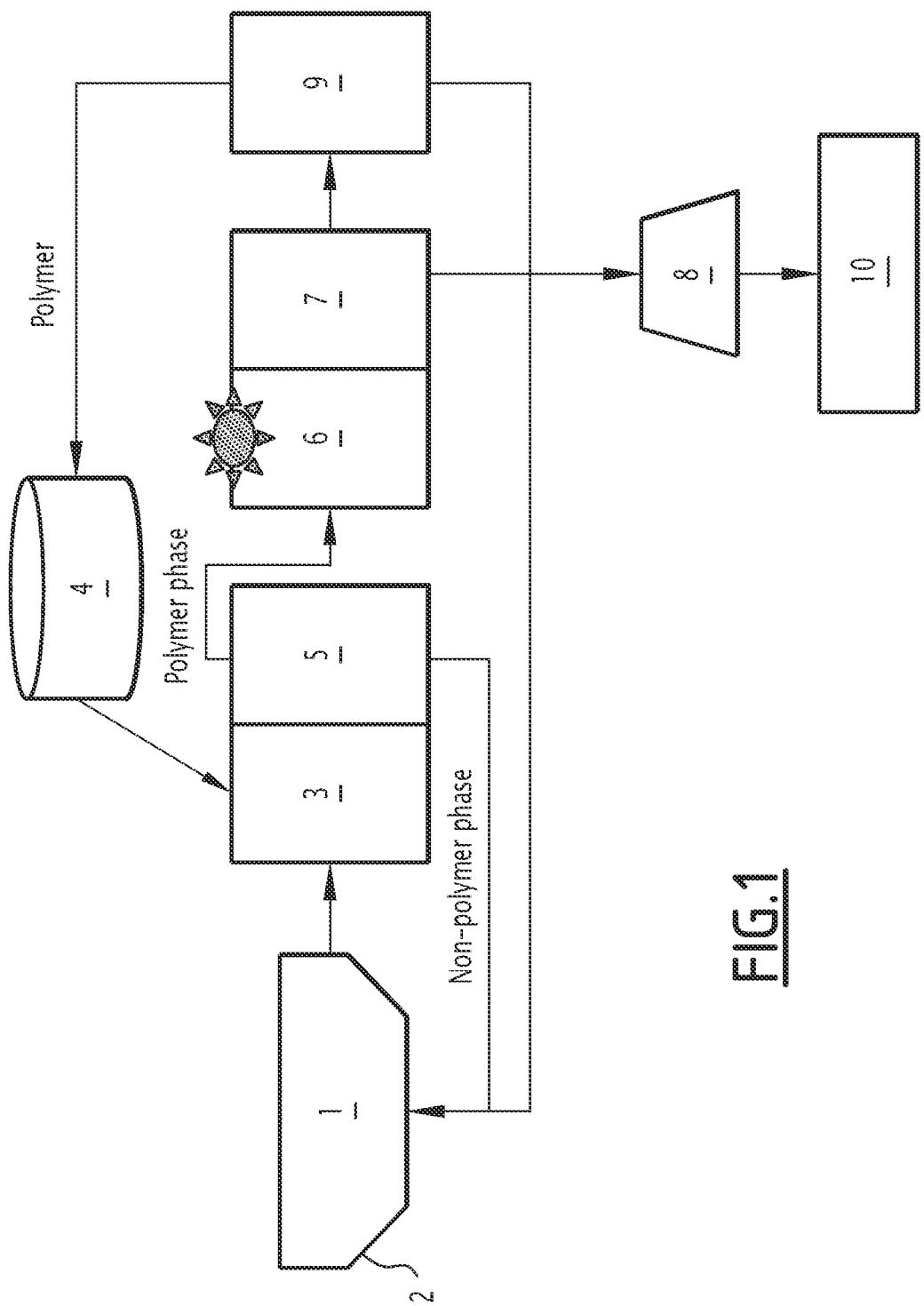
FIG. 1 schematises the succession of operations to be performed for optimal implementation of the method of the invention.

This method is preferably a continuous method implemented for example on the facility schematically illustrated in FIG. 1, with continuous or intermittent withdrawing of a fraction of the pickling bath 1 contained in the pickling tank 2 itself or in any other container into which the pickling bath to be regenerated 1 may have been transferred. This allows lengthening of the efficient lifetime of the bath 1 compared with batch treatment since the stability of the composition thereof over time is better ensured.

The extraction method of the invention at a first step entails the formation in a mixer reactor 3 of an aqueous two-phase system between the fraction of pickling bath 1 withdrawn from the pickling tank 2 and a polymer stored in a dedicated receptacle 4 e.g. polyethylene glycol (PEG). Preferably the pickling tank is continuously fed with fresh pickling bath 1.

In general, the inventors have ascertained that the polymer able to be used to implement the invention must be a polymer having a chain comprising an unhindered ether function. By «unhindered», it is understood that no group must be grafted on the chain in the vicinity of atom O of the ether function which could hinder the action thereof.

Polyethylene-glycol PEG is a preferred example of said polymer able to be used in the invention. It is recalled that it has the general formula:

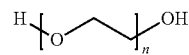

Tetraethylene-glycol dimethylether of general formula:

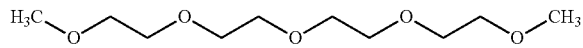

can also be used in the invention since it proves capable of extracting Cr(VI). It can be compared to a PEG of low molecular weight (222 g/mol) and not having any end OH groups.

Triethylene-glycol dimethylether of formula:

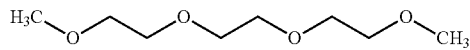

also belongs to the polymers able to be used.

Conversely, polypropylene-glycol (PPG), having the general formula:

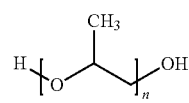

Is not suitable for implementing the invention since its ether function is hindered by the $CH_3$ group that is close to the ether function.

On the other hand, the inventors have ascertained that the block copolymer «Pluronic® 10R5» by BASF, of formula:

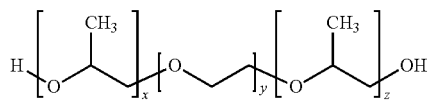

mixing together PEG blocks and PPG blocks and comprising end OH groups similar to PEG and PPG can be used for extraction of Cr(VI) according to the invention.

It is concluded that the presence of an unhindered ether function need not necessarily concern the entirety of the polymer chain, but it is sufficient that at least some portions of the chain should have said unhindered ether function so that the polymer, as component of an aqueous two-phase mixture, has the properties of extracting Cr(VI) from pickling baths of stainless steels.

The expression «comprises an unhindered ether function» is therefore to be understood as also concerning polymers which may only exhibit said unhindered ether function on a portion of their chain and not only the entirety of their chain, and that the presence of co-existing hindered ether functions within the chain is not a prohibitive characteristic.

It is also concluded from all these observations that the presence of end OH groups does not appear to play a significant role in the properties of the polymers from which the invention draws benefit.

With regard to PEG, there currently exists several types thereof which differ in average molecular weight. An increase in average molecular weight leads to an increase in the surface area of the two-phase region in the phase diagram of the mixture and in the viscosity of the mixture for a given temperature; molecular weight that is too high can reduce the efficacy of the polymer in extracting Cr(VI) under same operating conditions. This increase in molecular weight makes mixing, settling and separating operations more difficult. PEG-200, PEG-400 and PEG-600 (the latter is solid at ambient temperature similar to PEGs of higher molecular weights; it is therefore more difficult to handle than PEGs of lower molecular weight) represent the preferred examples of PEGs able to be used in the invention. PEG-400 proves to be the most efficient. PEG-200 allows good extraction of Cr(VI), but leads to respective volumes of polymer and non-polymer phases that are not optimal for implementing the method of the invention.

The preferred example of use of PEG-400 is now described in detail.

In general, the proportions of PEG-400 relative to the fluid must meet the following criteria.

The proportion of PEG-400 in the ternary mixture—formed by the pickling bath (considered to be a single chemical component), water and PEG-400—must be such that it lies between the line of the equation «weight % of PEG-400=100%–weight % of pickling bath» and the binodal curve of the pickling bath/PEG-400 mixture at bath temperature.

This criterion relating to the proportion of polymer used is also valid for any polymer other than PEG-400.

It is also preferable that the weight proportion of PEG-400 relative to the pickling bath should not be higher than 50%, so that the amount of PEG-400 to be used is not too high in relation to the quantity of Cr to be recovered, and the method certainly remains advantageous from an economic viewpoint.

Figure 2:
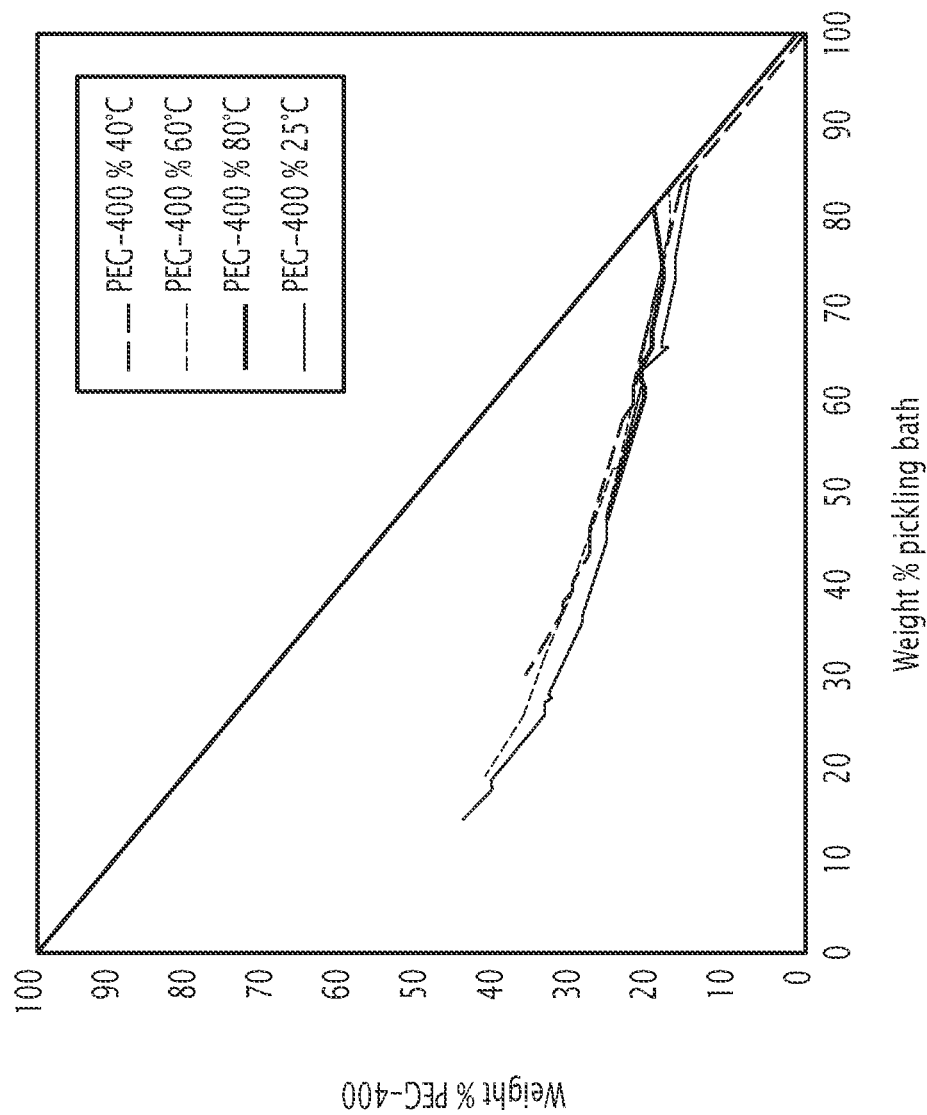
FIG. 2 shows which ranges of weight concentrations of PEG-400 in a mixture composed of PEG-400, pickling bath and water must be heeded for satisfactory implementation of the invention, for a bath having a certain composition and as a function of bath temperature.

FIG. 2 shows said line and said binodal curves of a PEG-400 bath at temperatures of 25 to 80° C. The impact of bath temperature on the binodal curve proves to be relatively minimal within the range under consideration.

Figure 3:
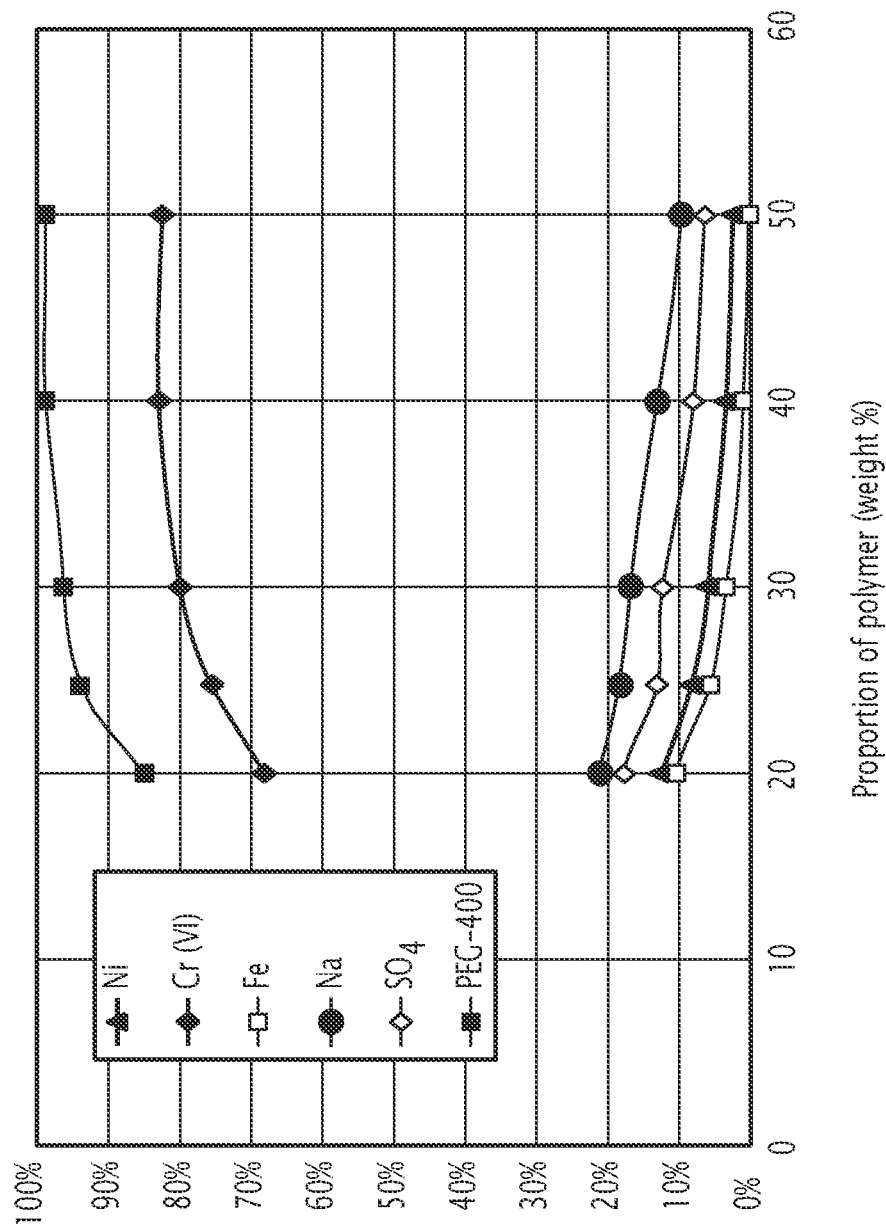
FIG. 3, in weight percentages, gives the distribution of elements in the phase containing the polymer after extraction, as a function of the proportion of polymer added to the initial bath.

When forming the aqueous two-phase system, the metals contained in the bath will be divided between the two phases and Cr(VI) will mostly be directed towards the phase containing the largest amount (by weight) of polymer. FIG. 3 in weight percentages gives the distribution of the elements in the phase containing the polymer after extraction, as a function of the proportion of polymer added to the initial bath.

The composition of the tested bath was the following: Total Cr: 11.7 g/l; Fe: 0.5 g/l; Ni: 0.4 g/l; Na: 47 g/l; $SO_4^{2-}$: 106 g/l; pH=1.8; density: 1.14.

The conditions under which this diagram was plotted are as follows.

The diagram was obtained for a sample of industrial pickling bath such as defined above, to which different proportions of PEG-400 were added. The temperature was controlled at T=80° C.± 3° C. and tested total volumes varied between 10 ml and 1.5 l. In one experimental variant, the total content of Cr was modified by reducing this content to 5 g/l, and setting the temperature at T=67° C. for a total volume of 1.5 l. The results given in the diagram (expressed in weight %) did not show any signification variation throughout these various experiments.

The proportion of Cr passing into the phase in which most and even all the polymer (here PEG-400) is to be found mixed with water (this mixture being called «polymer phase»), increases with the weight proportion of polymer in the treated bath. Conversely, the proportion of the other measured elements and ions (Ni, Fe, Na, $SO_4^{2-}$) decreases with this same weight proportion of polymer in the treated bath. These other elements and ions are therefore found in vast majority in the other phase (called «non-polymer phase»).

In one test example, the addition was made to the aforementioned pickling bath of an amount of PEG-400, of density 1.13, equal to 0.66 times the weight of pickling bath, in other words 0.58 times the volume of pickling bath. This PEG-400 was withdrawn from the receptacle 4 in FIG. 1. The mixer reactor 3 therefore contained a bath, which was left under agitation, having a weight 1.66 times the initial weight of the pickling bath and the volume 1.58 times the initial volume of the pickling bath.

The mixture was afterwards transferred to a separator device 5 such as a gravity settler to obtain an upper polymer phase and lower non-polymer phase.

It is to be understood that it is fully possible for the separator device 5 to be integrated with the mixer reactor 3. For example, using a twin-flow reactor.

In the described test example, the polymer phase on completion of the separation operation represents 78% of the total volume and the non-polymer phase 22% of the total volume.

The polymer phase contains 7.9 g/l of Cr(VI), substantially no Fe and no Ni, 6.5 g/l of $Na^+$, 8.2 g/l of $SO_4^{2-}$, 570 g/l of PEG-400. It has a pH of 1.8 and density of 1.12. It represents 0.55 times the initial weight of pickling bath and 0.65 times the initial volume of pickling bath.

The non-polymer phase contains 3.7 g/l of Cr(III), substantially all the Fe and Ni initially contained in the pickling bath, 108 g/l of $Na^+$, 228 g/l of $SO_4^{2-}$, 22 g/l of PEG-400. It has a pH of 2.6 and density of 1.29. It represents 0.45 times the initial weight of pickling bath and 0.35 times the initial volume of pickling bath.

It can be seen in FIG. 3 that on and after a proportion of 40 weight % PEG-400 in the bath, almost all the PEG-400 is found in the polymer phase (there subsists about 1 weight % in the non-polymer phase) and conversely practically all the Fe and Ni, these being the metal ions essentially present in the bath derived from the pickled steel, are found in the non-polymer phase (the $Na^+$ et $SO_4^{2-}$ ions are also mostly found in the non-polymer phase). As for Cr, this is found in an amount of about 85% in the polymer phase. However more detailed analysis of results shows that the Cr found in the polymer phase is entirely composed of Cr(VI) that it was desired to extract in priority from the pickling bath. The Cr found in the non-polymer phase is Cr(III).

The inventors therefore ascertained during these tests that Cr(VI) is the sole metal ion, among those that were sought, that is very significantly present in the polymer phase. Even Cr(III), which is residually found in the bath after electrolytic pickling, is not significantly extracted by PEG-400.

Metal ions other than the various Fe, Cr, Ni ions (this latter element being present if conventional grades of austenitic stainless steels are treated in which this element is strongly present) derived from pickled steel and which are not oxonium ions contrary to Cr(VI)-containing ions, can also be found in the pickling bath in relatively small amounts depending on the specific steel grade treated. As shown in FIG. 3, these ions are most essentially found in the non-polymer phase and are therefore not significantly extracted from the bath.

This is not detrimental in the spirit of the invention. The object is to recover the Cr(VI) contained in the electrolytic pickling bath, typically via pyrometallurgic means, so that in particular it can be recycled in metal Cr form which optimally can be returned to the steelmaking furnace which produced the steel that was the subject of pickling. In this manner, the production of waste polluted by Cr(VI) is avoided and additionally the Cr derived from pickling can be returned to the steel production circuit, hence providing substantial savings in raw materials. If this recovered Cr is not very pure, in that it may contain other metals initially present in the steels treated by the pickling facility, this is not necessarily a major drawback since these metals are also intended to be significantly included in the composition of the steel that will be produced with this recovered Cr, or are tolerable up to levels that most generally are not at risk of being exceeded through use of the recovered Cr of the invention.

One possible exception could be Mo, a portion of which as will be seen may be found in the polymer phase when the pickling bath has treated stainless steels containing Mo. However, in practice and most often the addition of the Cr recovered with the method of the invention is rarely sufficient to cause the Mo content to exceed a value that is tolerable in a stainless steel that is not meant to contain a significant quantity of Mo. Should the recovered Cr have a Mo content that is too high for use in large amounts in the preparation of steel not alloyed with Mo, it can be envisaged to make use thereof as raw material in a smelting furnace in addition to other raw materials low in Mo which will dilute the Mo contributed by the recovered Cr.

Significant pollution of the polymer phase by S could be detrimental, since it would compromise the possibility of recovering Cr via pyrometallurgic processes and lead to the release of too high levels of sulphur-containing compounds. However, FIG. 3 shows that the $SO_4^{2-}$ ions in the described example are found at more than 90% in the non-polymer phase and their residual presence in the polymer phase therefore remains acceptable.

If the Cr to be recovered is intended to be used for a purpose other than recycling back to steelmaking, it is possible that it may be desired that the purity thereof should be better than just described. In this case, it must be verified that the concentration in the polymer phase of compounds other than Cr(VI) is sufficiently low so that the intended use of the Cr is effectively possible having regard to treatment processes subsequently to be carried out. This may possibly lead to:

Use of the Cr obtained with the method of the invention only when the pickling baths have treated steels with low contents of alloy elements other than Cr and Ni, the ions of which might significantly pass into the polymer phase; baths which have repeatedly treated steels with high Mo content could therefore be unfit for some uses, as can be easily appreciated case-by-case by persons skilled in the art;

Or application to the polymer phase and/or to the products derived therefrom of additional metal separating processes which would improve the purity of the Cr obtained after recovery.

As shown in FIG. 3, increasing the proportion of PEG-400 in the bath up to 50% causes little or no change in the distributions of the polymer, Cr(VI) and Fe between the two phases, but migrations of $Na^+$, $SO_4^{2-}$ and $Ni^{2+}$ into the non-polymer phase are slightly further increased. Almost all the polymer is found in only one of the phases, namely the polymer phase which also contains almost 85% of initial Cr which, as mentioned, corresponds to all the Cr(VI) contained in the pickling bath, the remaining 15% of initial Cr being Cr(III) that is entirely found in the non-polymer phase. There may remain about 1% of polymer in the non-polymer phase.

The explanation for this distribution of the various ions of the various metal elements between the polymer phase and the non-polymer phase is apparently that PEG-400, like the other polymers able to be used in the invention defined above, only extracts the oxonium ions of these metals i.e. those containing oxygen. Regarding Cr, the $HCrO_{4-}$ and $CrO_4^{2+}$ ions present in the pickling bath are extracted in the polymer phase, and these are precisely the ions in which Cr is of valence VI. On the other hand, the $Cr^{3+}$ ions remain in the non-polymer phase with the $Fe^{2+}$ and $Ni^{2+}$ ions in particular.

Testing has also shown that when $Cu^{2+}$, $Mo^{2+}$ and $Mn^{2+}$ ions are contained in the pickling bath, they are also found at least in large majority in the non-polymer phase. However, the $MoO_{4-}$ ions, if any, are found in the polymer phase since they are oxonium ions. Mo therefore behaves as Cr in the invention. It was seen above how this is not necessarily a major drawback and how it can be remedied if needed.

After separating the two polymer and non-polymer phases in the suitable device 5 via filtration, settling, or any other conventional method adapted to the respective properties of the phases, the phase not containing the polymer i.e. the spent bath from which the entirety of Cr(VI) has been removed, can be reused as pickling bath without being very significantly polluted by the polymer. It is returned to the pickling bath 1 remaining in the tank 2 if the method is a continuous method. This returning of the non-polymer phase to the pickling bath can be carried out for as long as it does not deteriorate too significantly the efficacy of the pickling bath.

Through experimenting, the user can set the tolerable content threshold of Cr(VI) in the pickling bath after which the efficacy of the bath could no longer be considered to be sufficient. In this case the tank 2 must be emptied for total renewal of the pickling bath, or the pickling bath 1 diluted with fresh components to lower the Cr(VI) content to a suitable level. At all events, the almost total removal of Cr(VI) with the method of the invention allows the lifetime of pickling baths 1 to be significantly lengthened before emptying the tank 2 or significantly diluting the bath 1 become necessary. As already indicated, the continuous feeding of the tank 2 with fresh pickling bath allows delaying of the time when this emptying becomes necessary.

Experimenting has also shown that the returning of Fe and Ni via the recycled non-polymer phase does not significantly deteriorate the efficacy of the pickling bath. It is therefore above all the Cr(VI) content of the pickling bath that must be periodically monitored to determine at which time recycling of the non-polymer phase must be interrupted, without needing any special precaution, so that suitable efficacy is restored to the pickling bath.

At a second step of processing, the polymer phase is treated to extract therefrom one or more Cr-containing compounds present therein, even also optionally to isolate the polymer for the purpose of reuse thereof at the first extraction step. This treatment consists of leaving Cr-containing precipitates to form naturally without the need to add reagents. This can be achieved simply by leaving said polymer phase to stand, optionally whilst heating to accelerate precipitation. However, preferably this precipitation is accelerated by means of irradiating the polymer phase.

By exposing this polymer phase rich in Cr and preferably placed in the form of a liquid film of thickness of about a few cm for example, to irradiation in a suitable installation 6 by at least one light source having radiation wavelength(s) typically emitted within the wavelength range of 340-860 nm i.e. in the UV spectrum or visible spectrum, Cr is typically precipitated in $Cr(OH)_3$ form. It is then possible via simple filtration (or any other suitable solid-liquid separation method) in a dedicated installation 7, to recover a solid 8 rich in Cr, the liquid phase particularly containing the polymer.

The placing in liquid film form of the Cr-rich phase for irradiation thereof is a preferred method since the solution is very dark and the photons emitted by the light source(s) are only able to pass through a bath layer of limited thickness. Another possible solution is to place the solution in a vessel equipped with an agitation device so that the solution exposed to radiation is permanently renewed. It is can also be fully envisaged to accumulate the two operating modes by irradiating the bath under agitation before it is placed in film form. Care must also be taken to ensure that the Cr-containing precipitate is not deposited on the light source, for example by placing the source at sufficient distance away from the bath and/or by frequently cleaning the source in particular if it is integrated in the walls of the container.

One solution is to provide a vessel of large size provided with a multiplicity of regularly distributed light sources, each being cleaned in turn while the other sources remain operational.

Optimisations of wavelength and illuminance power required for optimal performing of the method on a given installation can be obtained through routine experiments, in particular as a function of the composition and opacity of the pickling baths that the user must treat, the thickness of the liquid through which radiation must pass, etc.

Experiments have shown however that it is possible to dispense with irradiation in the UV-visible spectrum and to obtain precipitates substantially of same type as with irradiation. The recovery reaction of Cr(VI) from the polymer phase can therefore also take place in installation 6 without the assistance of the described irradiation. However, in this case reaction kinetics are less favourable.

Heating of the polymer phase can improve such kinetics. Heating can also be applied simultaneously with irradiation of the polymer phase.

Another seemingly simpler manner in which to form the Cr-containing precipitate, is to add sodium hydroxide or lime $Ca(OH)_2$ to the polymer solution. It is also possible, before adding the sodium hydroxide, to add $NaHSO_3$ to reduce Cr(VI) to Cr(III), the sodium hydroxide then causing Cr(III) to precipitate.

However, this would lead to the use of additional chemical products which would degrade the ecological and economical balance of the operation, and would pollute the polymer and reuse thereof would be impossible at least without additional treatments. Also, if sodium hydroxide or lime are added alone, the yield of the operation would be very low since there is not a sufficient amount of Cr(III) in the polymer phase. With a prior addition of $NaHSO_3$, the yield is higher but the precipitate becomes enriched with sulphate, hence sulphur, and it has been since that this major presence of sulphur is not compatible with recovery of Cr via pyrometallurgy as is preferred. Furthermore, the addition of these chemical products leads to a change in pH making it basic, which must be corrected if the reaction products are recycled back to the bath. Overall, this manner of proceeding is therefore not advisable since the formation reaction of the Cr-containing precipitate does not require the addition of chemical products to take place, and whenever necessary the reaction can be accelerated by heating and/or irradiation in the UV and/or visible range.

Therefore, according to the invention, the Cr-containing precipitate is left to form i.e. formation takes place naturally without the addition of chemical products. If desired, the kinetics of this formation can be accelerated via the addition of heat and/or irradiation in the UV or visible range.

The photochemical mechanisms for obtaining Cr-containing precipitates via irradiation are set forth for example in the article: «An ecological new approach for treating Cr(VI)-containing industrial wastewater: Photochemical reduction» by Jie Liu, Kun Huang, Keng Xie, Ying Yang, Huizhou Liu, Water Research, 93(2016) pp. 187-194. However, the photochemical treatment of extracts of stainless-steel pickling baths is not envisaged. In addition, contrary to the view of the authors of this article, the experience of the inventors has shown that precipitation of Cr-containing compounds without irradiation is possible at least on pickling baths of stainless steels containing sulphates, provided sufficient time is afforded and/or the medium is heated to accelerate the reaction.

Figure 4:
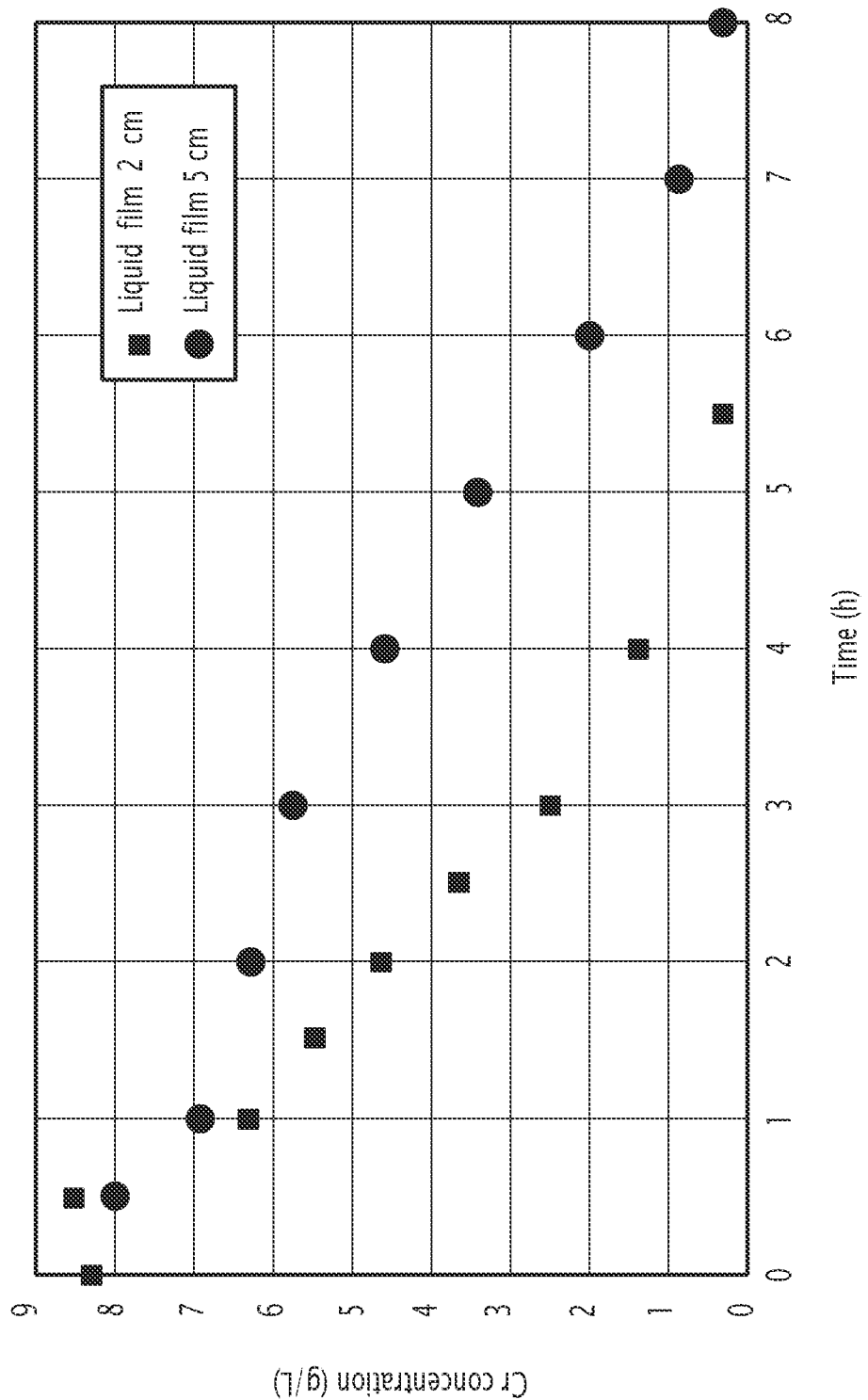
FIG. 4 shows the kinetic change in Cr content of the phase containing the polymer during exposure to light, according to the thickness of the liquid film to be treated.

The kinetics of this reduction in Cr concentration in the liquid therefore depend on the light intensity received by the medium as shown in FIG. 4 illustrating experiments conducted on the polymer phase of PEG-400 containing Cr obtained after the test illustrated in FIG. 1. Before being added to the bath, the PEG was pre-heated to the same temperature as the bath so that this addition did not cool the bath and to obtain optimal kinetics of the reduction of Cr concentration in the liquid film. In FIG. 4, it can be seen that the reduction in Cr concentration of the liquid film is faster the narrower the thickness of the treated film (5 or 2 cm), at the same emitting intensity of the light source.

The light source is a continuous spectrum lamp in the described tests. Illuminance thereof measured in the visible at a distance of d=250 mm is 9000 Lux; at d=200 mm it is 12000 Lux. It has a power of a 11.6 $W/m^2$, of which 25% in the ultra-violet (<392 nm).

In other words, a given weight quantity of polymer phase placed in the form of a film of 2 cm thickness, receives a quantity of light energy greater than that received by the same weight quantity of polymer phase placed in film form of 5 cm thickness subjected to the same light source with the same irradiation intensity, and logically this impacts the efficacy of treatment. If, in both cases, the initial Cr concentration in the polymer phase is 8.5 g/l, a Cr concentration in the liquid film of 1.5 g/l is reached after 4 h for a film of 2 cm thickness and about after 6.5 h for a film thickness of 5 cm. The Cr concentration of the liquid film becomes practically zero after about 5.5 h for a film of 2 cm thickness, and after 8 h for a film of 5 cm thickness.

Once most of the Cr has precipitated and been separated from the liquid in which it was contained at the step just described, it is necessary to dehydrate the polymer contained in the polymer phase now rid, depleted of most of the Cr it has captured, if it is desired to reuse this polymer at the first Cr extraction step from the pickling bath, as is preferable. Since the boiling points of the polymer and water are very different, it is possible to recover the dehydrated PEG-400 by means of a distillation step for example performed in a dedicated installation 9. This dehydrated PEG-400 is sent into the receptacle 4 containing the polymer used in the method of the invention. The water extracted in the distillation installation 9 and then recondensed can preferably be reused at the start of the method being returned to the pickling tank 2.

Regarding the solid phase containing the Cr, this is treated after optional drying whenever necessary, with a process allowing recovery of the Cr and even of the other metals it may contain, in a dedicated installation 10 for example applying any pyrometallurgical process known per se that is compatible with the composition and physical properties of the solid phase. In particular, a process of pyrometallurgical reduction of oxides using carbon can be applied.

In general, the various installations that have been mentioned are preferably even mandatorily on the same site as the pickling facility, in particular when the method used is a continuous method with recycling or reuse in the pickling facility of the regenerated polymer and of some by-products, and when the pickling bath 1 remains in the pickling tank 2 without being transferred to another receptacle. However, it is fully possible for the Cr recovery installation 10 to be located at a different site, towards which the Cr-containing solid phase 8 can be transported, since the products derived from this recovery are not intended to be reinjected into the facility of the invention.

It will be noted that the operations of recycling the non-polymer phase in the pickling bath 1, of reuse of the polymer after dehydration and of returning the water resulting from this dehydration back to the pickling tank 2, can be carried out or omitted independently of each other as desired by the user. The version of continuous implementation of the method described and illustrated is the version whereby a maximum quantity of recovered materials, not containing large quantities of Cr and even of other recoverable metals which may be captured in the polymer phase, is recycled back to the facility by means adapted for this purpose. In this manner, the additions of external materials are minimised, provided the composition of the pickling bath 1 remains compatible with proper implementation of pickling. However, it is possible to choose not to have recourse to some of these recycling operations and reuses, in particular if the method of the invention as a variant is implemented as a batch method.

One variant of the invention can also consist of treating the non-polymer phase before it is sent back to the pickling bath 1 to extract at least some of the chemical species contained therein which would cause a change that is too strong and too rapid and/or undesired in the composition of the pickling bath 1, if the non-polymer fraction were to be returned without treatment. As indicated above, the Fe and Ni contained in the non-polymer phase are not generally detrimental if they are returned to the pickling bath 1. However, it cannot be fully excluded that other metal ions, by accumulating in the pickling bath 1, may have more harmful effects if significantly present in the non-polymer phase.

This could especially concern the residual presence of spent polymer in the recycled non-polymer phase which would most perturb the efficacy of the method of the invention. Optional treatment of the non-polymer phase before it is returned to the pickling bath should therefore have as chief purpose:
  Either to extract and regenerate the residual polymer to restore the same characteristics as those of the polymer contained in the receptacle 4, namely fresh polymer or dehydrated polymer obtained from the polymer phase in the distillation installation 9;
  Or to degrade the residual polymer, in particular via an Advanced Oxidation Process.

As an example, a description can be given of the mass balance of an implementation of the method of the invention as follows wherein the PEG-400 used is entirely derived from recycling of spent PEG-400 performed in the dehydration installation 9.

The starting product is a pickling bath 1 for stainless steels, essentially containing $Na_2SO_4$ in aqueous solution and having the following characteristics:

Total Cr: 11.7 g/l; Fe: 0.5 g/l; Ni: 0.4 g/l; Na: 47 g/l; $SO_4^{2-}$: 106 g/l; pH=1.8; density: 1.14.

From the pickling tank 2 containing the bath, 6 kg of this bath 1 are withdrawn and placed in the mixer reactor 3 to which there are also added 4.0 kg of PEG-400 recycled from the final step of the method and which residually contain 3 g of Cr. The whole is placed under agitation.

The components of the mixture, after agitation, are transferred to the separator device 5 to be separated into a polymer phase and non-polymer phase as previously seen. As a variant, separation can take place in the mixer reactor 3 if it is capable of performing both functions. This gives:
  2.4 kg of non-polymer phase containing 4 g of Cr in Cr(III) form which is returned to the pickling tank 2;
  7.6 kg of liquid polymer phase containing 57 g of Cr in Cr(VI) form.

The polymer phase is sent to the irradiation installation 6, and the precipitates and liquid phase resulting from this irradiation (on the understanding, as previously mentioned, that this irradiation is only used to accelerate the formation of precipitates which would nevertheless take place without the need to add any chemical products) are then separated in the solid-liquid separator installation 7.

The resulting solid phase 8 represents 0.5 kg and contains 54 g of Cr in Cr(VI) form. After drying the solid phase (the weight thereof being reduced to 0.2 kg) and treating said solid phase in the pyrometallurgic installation 10, 54 g of Cr are recovered.

The liquid phase comprising the polymer represents 7.1 kg and contains 3 g of Cr in Cr(VI) form. It is dehydrated in the distillation installation 9. The distillate which represents 3.0 kg and does not contain Cr is returned to the pickling bath 1. The 4 kg of PEG-400 which are recovered through distillation and containing 3 g of q Cr (VI) are returned to the mixer reactor 3 to start a new recovery cycle of the Cr contained in the pickling bath 1.

There is no loss of the 61 g of Cr withdrawn from the pickling bath 1 throughout treatment, since both the 4 g of Cr(III) derived from the separator installation 5 and the 3 g of Cr(VI) in the recycled PEG-400 after the dehydration step 9 of PEG-400 by distillation are fed back into the treatment circuit of the pickling bath, and 54 g of Cr are recovered after the pyrometallurgical treatment 10.

One embodiment of implementation of the method of the invention has been described and illustrated in detail that operates continuously, wherein the polymer and the liquid phases depleted of Cr are recycled back to the pickling bath. Optionally, the continuous nature of the method can be enhanced via constant feeding of the pickling tank 2 with fresh pickling bath 1. Evidently, it would remain within the spirit of the invention to implement the method in full batch mode. Under these conditions, as soon as it is ascertained that the composition of the pickling bath 1 is on the point of no longer being able to carry out its function properly, due to concentrations that are too high of Cr, polymer and/or other elements or substances governing chemical and electrochemical equilibria, the entirety of the pickling bath is treated in a single operation with the method of the invention. The liquids and Cr-depleted polymer phase are then recycled so that they form all or part of a fresh pickling bath 1, and the Cr-rich solid phase is sent to the metal recovery installation 10 to recover the metals contained in said phase, Cr in particular, which allows reuse of these metals and avoids discharge into the environment of waste containing these metals and therefore potentially harmful.

Evidently, the list of equipment used to apply the method of the invention is not exhaustive. Other accessory items of equipment, as is conventional, can be added to carry out usual functions for the treatment of materials comparable to those concerned by the invention, or for optimal performing of the functions carried out by each of the cited items of equipment.

Also, while the invention is preferably applied to the treatment of pickling baths for steels containing significant quantities of Cr as is the case for stainless steels, it can fully be envisaged to apply the invention to the treatment of pickling baths for other Cr-containing alloys for which the aforementioned problems would also arise.

The invention claimed is:

1. A method for recovering Cr contained in a pickling bath for pickling metallic materials, the pickling bath being held in a tank, said pickling bath being an aqueous solution containing at least one sulphate and Cr derived from a pickled metal, wherein:
    an aqueous two-phase system is formed from at least one portion of said pickling bath and from a polymer comprising an unhindered ether function, the polymer being selected from the group consisting of PEG-200, PEG-400, PEG-600, tetraethylene-glycol dimethylether, triethylene-glycol dimethylether, and block copolymers of polyethylene glycol and polypropylene glycol,
    a proportion of the polymer in a ternary mixture-formed by the pickling bath considered to be a single chemical component, water and the polymer-being such that said proportion lies between a line of an equation weight % of polymer=100%–weight % of pickling bath and a binodal curve of the pickling bath/polymer mixture at bath temperature, said aqueous two-phase system comprising a polymer phase, in which most of the Cr is found, and a non-polymer phase;
    said polymer and non-polymer phases are separated, the polymer phase containing less than 0.03% S;
    Cr-containing precipitates are formed in the polymer phase;
    solid-liquid separation is performed on said polymer phase to separate the polymer and the Cr-containing precipitates;
    said Cr-containing precipitates are treated to recover the Cr contained in said Cr-containing precipitates; and
    said non-polymer phase of said aqueous two-phase mixture is sent to the tank containing the pickling bath,
    wherein, before said non-polymer phase of said aqueous two-phase mixture is sent to the tank containing the pickling bath, a treatment is performed on the non-polymer phase comprising degrading residual polymer via an advanced oxidation process.

2. The method according to claim 1, wherein, to accelerate a formation kinetics of the Cr-containing precipitates and the polymer, said polymer phase is irradiated before said solid-liquid separation by exposing said polymer phase to at least one light source of wavelength between 340 and 860 nm.

3. The method according to claim 2, wherein, prior to exposing said polymer phase to said light source, the polymer phase is placed in the form of a liquid film.

4. The method according to claim 1, wherein, after said solid-liquid separation on said polymer phase, a liquid fraction resulting from the separation is dehydrated to recover the polymer contained in the liquid fraction and said polymer is reused to form said aqueous two-phase mixture.

5. The method according to claim 4, wherein said dehydration is performed by distillation.

6. The method according to claim 4, wherein water resulting from said dehydration is sent to the tank containing the pickling bath.

7. The method according to claim 1, wherein recovery of Cr from the Cr-containing precipitates is performed by a pyrometallurgical process.

8. The method according to claim 7, wherein said pyrometallurgical process is a process of pyrometallurgical reduction of oxides using carbon.

9. The method according to claim 1, wherein the tank containing the pickling bath is continuously fed with pickling bath.

10. The method according to claim 1, wherein said pickled metal is a stainless steel.

11. The method according to claim 1, wherein the polymer is selected amongst PEG-200, PEG-400 and PEG-600.

12. The method according to claim 1, wherein, to accelerate a formation kinetics of the Cr-containing precipitates, said polymer phase is irradiated before said solid-liquid separation by exposing said polymer phase to at least one light source in the UV spectrum.

13. The method according to claim 1, wherein Fe and Ni originated as metal ions from the pickling bath, are found in the non-polymer phase.

14. The method according to claim 1, wherein, before said non-polymer phase of said aqueous two-phase mixture is sent to the tank containing the pickling bath, a treatment is performed in the non-polymer phase comprising extracting and regenerating from the non-polymer phase a residual polymer and reusing the regenerated polymer to form said aqueous two-phase mixture.

15. The method according to claim 1, wherein lime $Ca(OH)_2$ is added to the polymer phase solution.

16. The method according to claim 1, wherein a weight proportion of the polymer relative to the pickling bath is not higher than 50%.

17. A method for recovering Cr contained in a pickling bath for pickling metallic materials, the pickling bath being held in a tank, said pickling bath being an aqueous solution containing at least one sulphate and Cr derived from a pickled metal, wherein:
    an aqueous two-phase system is formed from at least one portion of said pickling bath and from a polymer comprising an unhindered ether function, the polymer being selected from the group consisting of PEG-200, PEG-400, PEG-600, tetraethylene-glycol dimethylether, triethylene-glycol dimethylether and block copolymers of polyethylene glycol and polypropylene glycol,
a proportion of the polymer in a ternary mixture formed by the pickling bath considered to be a single chemical component, water and the polymer being such that said proportion lies between a line of an equation weight % of polymer=100%−weight % of pickling bath and a binodal curve of the pickling bath/polymer mixture at bath temperature, said aqueous two-phase system comprising a polymer phase, in which most of the Cr is found, and a non-polymer phase;
said polymer and non-polymer phases are separated, the polymer phase containing less than 0.03% S;
Cr-containing precipitates are formed in the polymer phase;
solid-liquid separation is performed on said polymer phase to separate the polymer and the Cr-containing precipitates;
said Cr-containing precipitates are treated to recover the Cr contained in said Cr-containing precipitates,
wherein lime $Ca(OH)_2$ is added to the polymer phase.

* * * * *